No. 728,557. PATENTED MAY 19, 1903.
M. H. EISEMAN.
HOOK AND EYE.
APPLICATION FILED OCT. 20, 1902.
NO MODEL.
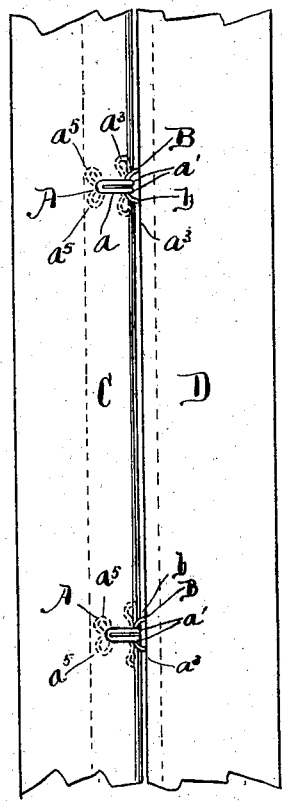
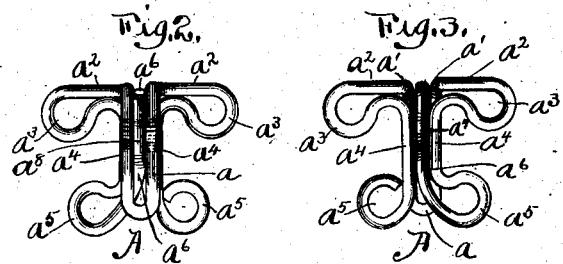
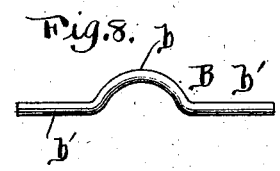
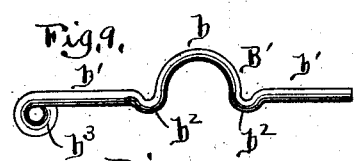
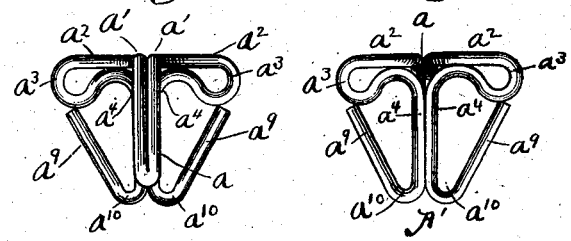
Witnesses
Samuel W. Banning
Walker Banning
Inventor
Moses H. Eiseman
By Banning & Banning
Attys.

No. 728,557. Patented May 19, 1903.

UNITED STATES PATENT OFFICE.

MOSES H. EISEMAN, OF CHICAGO, ILLINOIS, ASSIGNOR OF ONE-HALF TO FREDERICK W. FRANCE, OF CHICAGO, ILLINOIS.

HOOK AND EYE.

SPECIFICATION forming part of Letters Patent No. 728,557, dated May 19, 1903.

Application filed October 20, 1902. Serial No. 128,055. (No model.)

*To all whom it may concern:*

Be it known that I, MOSES H. EISEMAN, a citizen of the United States, residing at Chicago, in the county of Cook and State of Illinois, have invented a certain new and useful Improvement in Hooks and Eyes, of which the following is a specification.

This invention relates to that type of hook and eye in which the hook is inserted or applied by entering the hook through a hole in the folded edge of the material for the base to lie within the fold and the hook to lie outside of the fold; and the invention pertains more especially to the construction of the hook as a whole.

The object of the invention is to form the hook as a whole preferably from a single piece of wire so bent as to have a hook and base united by a neck which forms the closed end of the hook and to furnish eyes or loops for the base.

The invention consists in the features of construction hereinafter described and claimed.

In the drawings, Figure 1 is a plan view showing two pieces of fabric or material united one to the other by the hooks and eyes of the present invention; Fig. 2, an enlarged plan view of the hook as a whole; Fig. 3, an enlarged bottom view of the hook as a whole; Fig. 4, a side elevation, enlarged, of the hook, showing a retaining bend or guard in the bill of the hook and a retaining bend or guard in an intermediate bar between the side bars of the base; Fig. 5, a similar view to Fig. 4, showing the bill of the hook provided with a retaining bend or guard; Fig. 6, an enlarged plan view showing a modification in the formation of the base; Fig. 7, an enlarged bottom view of the hook as a whole shown in Fig. 6; Fig. 8, a plan view of one form of eye; Fig. 9, a plan view showing a modified form of eye; Fig. 10, a plan view of an ordinary eye, and Fig. 11 a side view of the hook of Figs. 6 and 7.

The hook A, Figs. 2, 3, and 4, is formed with a bill $a$, united to the base by a curved neck or end $a'$, which, as shown, is in a plane with the forward end of the base or body. The base or body is formed of front end bars $a^2$, projecting laterally on each side of the bill, each end bar terminating in an eye or loop $a^3$, and extending from the eye or loop on each side is a side bar $a^4$ below and in the same plane, or approximately so, of the side bars of the bill, each side bar $a^4$ terminating in an eye or loop $a^5$ in a plane to one side of the plane of the bill, the two loops lying on opposite sides of the bill, and, as shown in Figs. 2, 3, and 4, a continuing bar $a^6$ extends from one of the eyes or loops $a^5$ forwardly and intermediate of or between the side bars $a^4$, with its forward end terminating between the two parts of the neck, and this intermediate bar rearwardly of its forward end has therein an upward bend or curve, forming a retainer or guard $a^7$ to prevent the hook from becoming accidentally disengaged from the eye, and in addition, as shown in Fig. 4, the body of the bill of the hook has a downward bend or curve, forming a retainer or guard $a^8$ to coact with the retainer or guard $a^7$ against accidental disengagement of the hook and eye.

The construction shown in Fig. 5 has the retainer or guard $a^8$ only, the base having the several component parts thereof in the same plane and omitting the guard or retainer $a^7$. It is also evident that in the construction of Fig. 4 the retainer or guard $a^8$ could be omitted, leaving the retainer or guard $a^7$ only to prevent the disengagement of the hook and eye. The construction of hook shown in Figs. 6 and 7 departs from the construction shown in Figs. 2 and 3 in that each side bar $a^4$ is turned and continued as a diagonal side bar $a^9$, having at the juncture of the bar $a^4$ and the bar $a^9$ a loop or eye $a^{10}$, opened forwardly, giving, however, in effect, the broad base, as in Figs. 2 and 3, and the widened front end for a bearing in both forms of construction.

An eye B (shown in Fig. 8) can be used with the hook and can be formed from a piece of wire bent or curved centrally to form an eye $b$, with laterally-extending bars $b'$ on each side of the eye, or an eye B' for use with the hook can be formed as shown in Fig. 9, with a central curve or bend forming the eye $b$ and having on each side of the eye side bar $b'$, joined to the eye by a curve or bend $b^2$, one of the side bars having an eye $b^3$. The eye of either form of construction shown in Figs. 8 and 9 has end bars extending in a straight line to coact with the end bars $a^2$ of the bill, so that when the bill $a$ is entered into the eye $b$ and the eye engaged by the curve or neck $a'$ the two pieces of fabric or material will be drawn together at their adjoining edges and held in close relation, as shown in Fig. 1. The hook can also be used with the ordinary form of eye $B^2$, (shown in Fig. 10,) having an eye $b^4$ for engagement with the bill and loops or eyes $b^5$ for attachment to the fabric, and when the bill $a$ is engaged with the eye $b^4$ the adjoining edges of the two pieces of fabric or material will be drawn together in close relation.

The hook as a whole (shown in Figs. 2, 3, and 4) is preferably formed from a single piece of wire having the requisite diameter. Starting at one end, the wire is bent to form a loop $a^5$ and continued from the loop for a side bar $a^4$ and then turned laterally and given a return to form the eye $a^3$ and the end bar $a^2$ and then turned to form one side of the neck $a'$ and continued and returned to form the two sides of the bill $a$, and the return part is curved to form the other side of the neck $a'$, and the wire is extended laterally and turned to form the other end bar $a^2$ and the loop $a^3$ and is then continued to form the other side bar $a^4$ and then turned to form the other loop $a^5$ and continued to form the intermediate or center bar $a^6$, completing the base and bill as a whole. The intermediate bar is upwardly bent to form the retainer or guard $a^7$, projecting into the space between the bill $a$ and the base, and the bill is curved or bent to form the retainer or guard $a^8$ when the two retainers or guards are used, and with one retainer or guard only either the bend or curve in the intermediate bar or the bend or curve in the bill can be omitted. The form of bill $A'$ shown in Figs. 6 and 7 is also made, preferably, from a single piece of wire of the requisite diameter. Starting at one end, the wire is bent to form a diagonal side bar $a^9$ and a curve $a^{10}$ and continued in a straight line for a side bar $a^4$ and then turned laterally and bent on itself to form an eye $a^3$ and an end bar $a^2$, and from the end bar the eye is bent to form one side of the neck $a'$ and is continued to form a side bar of the bill and returned to form the other side of the bill, and the return is curved at the end to form the other side of the neck $a'$, and the wire is continued laterally and turned on itself to form the other end bar $a^2$ and the other eye $a^3$ and is then continued to form the straight side bar $a^4$ and then turned to form the other diagonal side bar $a^9$, with the open eye or curve $a^{10}$ completing the bill and its base. The construction shown in Figs. 6 and 7 has no intermediate or center bar $a^6$, and with this arrangement the bill only is provided with a curve or bend to form a retainer or guard $a^8$, as in Fig. 5.

The hook with either form of construction has a base wide at the inner end and furnishing the requisite bearing or contact at the forward end to maintain the alinement of the hook as a whole when inserted, and the form of the base is one which furnishes a bearing that will prevent the turning of the hook as a whole when inserted in position. The hook as a whole is applied to the fabric or material by folding the material on itself, so as to produce an edge fold, and a hole of the proper size is made in the edge fold, through which the hook is inserted and turned for the base to lie within the fold and the bill $a$ to be outside of the fold, as in Fig. 1, and when in position the straight forward end of the hook abuts against the folded edge of the material, with the base supported between the fold and the body of the material holding the hook in position without the necessity of attachment by sewing through the eyes, requiring only the line of stitching which holds the folded edge down to retain the hook in place; but, if desired, the hook can be further secured by sewing through the eyes $a^3$ and $a^5$, though this is not a necessity. The eye is applied to the companion fabric or material by folding the material on itself to produce an edge fold, through which perforations are made for inserting the eye shown in Fig. 8 or the eye shown in Fig. 9 by passing one end first through one perforation in the folded edge of the fabric or material and then through the other perforation, bringing the straight ends of the eye abutting against the fold on the inside, holding the eye in place by the engagement of the straight ends and the juncture of the eye with the straight ends without further sewing than stitching down the folded edge of the fabric or material. The uniting of the article at the open edge is had in the usual way by entering the hooks into the eyes, and when the hooks and eyes are engaged the two edges will be drawn together and held in close relation, and the bills of the hooks and eyes will be retained in position and have a firm support and bearing against the folded edge of the material, by which, in connection with the guard or retainer on the hook, the disengagement of the hook and eye will be prevented. It will be understood, however, that where it is not desirable or feasible to attach the hook by inserting the bill $a$ through a perforation in a folded edge the bill as a whole can be attached to the face of the fabric by sewing through the eyes $a^3$ and $a^5$ in the usual way of attaching hooks, and when so attached the broad base, in connection with the straight end face, furnishes a firm support for the hook on the fabric.

Some of the benefits and advantages pertaining to my invention in hooks and eyes are: The hook and eye, if so desired, can be applied and held in position without the usual practice of sewing them on, thus dispensing with the unsightly appearance of the stitches for sewing on hooks and eyes. The hooks and eyes can be applied with less time and labor than with hooks and eyes that require to be sewed on. The wide front end of the hook furnishes a bearing on each side of the line of strain. The broad wide base extending both sides of the plane of the bill furnishes a support which, in connection with the bearing at the front end, holds the hook against turning or becoming readily displaced. The hook and eye are entirely hidden from view, except as to the acting portion of each, enabling a more finished appearance to be presented and at the same time hiding the main portions of the hook and eye from observation. The hooks and eyes are held against withdrawal after insertion by the line of stitching which secures the folded edge to the body of the fabric or material, and by having eyes on the hook it enables the hook to be attached by sewing through the eyes in the usual manner of attaching hooks.

What I regard as new, and desire to secure by Letters Patent, is—

1. A hook for garments, consisting as a whole of a bill formed of two side bars united at the rear or entering end and open at the front or engaged end, a neck uniting the bill to the base and formed by curving or bending each side bar of the bill downwardly, and a base having an end bar on each side of the bill at the neck or engaging end thereof, each end bar starting from the curve or bend of each side bar of the bill at the neck and terminating at its outer end in an eye with a straight side bar starting at and extending from the eye and running beneath and parallel with the side bars of the bill, each side bar of the base having at its rear end an eye adjacent to the rear or entering end of the bill and projecting outside of the plane of the end of the bill, substantially as described.

2. A hook for garments, consisting as a whole of a bill having a curve therein and formed of two side bars united at the rear or entering end and open at the front or engaged end, a neck uniting the bill to the base and formed by curving or bending each side bar of the bill downwardly, and a base having an end bar on each side of the bill at the neck or engaging end thereof, each end bar starting from the curve or bend of each side bar of the bill at the neck and terminating at its outer end in an eye with a straight side bar starting at and extending from the eye and running beneath and parallel with the side bars of the bill, each side bar of the base having at its rear end an eye adjacent to the rear or entering end of the bill and projecting outside of the plane of the end of the bill, substantially as described.

3. A hook for garments, consisting as a whole of a bill formed of two side bars united at the rear or entering end and open at the front or engaging end, a neck uniting the bill to the base and formed by curving or bending each side bar of the bill downwardly, and a base having an end bar on each side of the bill at the neck or engaging end thereof, each end bar starting from the curve or bend of each side bar of the bill at the neck and terminating at its outer end in an eye with a straight side bar starting at and extending from the eye and running beneath and parallel with the side bars of the bill, each side bar of the base having at its rear end an eye adjacent to the rear or entering end of the bill and projecting outside of the plane of the end of the bill, and one of the side bars having a continuation forming an intermediate bar extending forwardly to the neck end of the bill and provided with a curve or bend forming a guard or retainer projecting into the space between the bill and the base, substantially as described.

4. A hook for garments, consisting as a whole of a bill having a curve therein and formed of two side bars united at the rear or entering end and open at the front or engaging end, a neck uniting the bill to the base and formed by curving or bending each side bar of the bill downwardly, a base having an end bar on each side of the bill at the neck or engaging end thereof, each end bar starting from the curve or bend of each side bar of the bill at the neck and terminating at its outer end in an eye with a straight side bar starting at and extending from the eye and running beneath and parallel with the side bars of the bill, each side bar of the base having at its rear end an eye adjacent to the rear or entering end of the bill and projecting outside of the plane of the end of the bill, and one of the side bars having a continuation forming an intermediate bar extending forwardly to the neck end of the bill and provided with a curve or bend forming a guard or retainer projecting into the space between the bill and the base, substantially as described.

MOSES H. EISEMAN.

Witnesses:
 THOMAS A. BANNING,
 OSCAR W. BOND.